(12) United States Patent
Rodriguez et al.

(10) Patent No.: US 6,311,285 B1
(45) Date of Patent: Oct. 30, 2001

(54) METHOD AND APPARATUS FOR SOURCE SYNCHRONOUS TRANSFERS AT FREQUENCIES INCLUDING AN ODD FRACTION OF A CORE FREQUENCY

(75) Inventors: Pablo M. Rodriguez, Burlingame; Kenneth R. Douglas, Sunnyvale; Alper Llkbahar, Santa Cruz; Harry Muljono, Union City, all of CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/300,538

(22) Filed: Apr. 27, 1999

(51) Int. Cl.[7] ........................................ G06F 1/04
(52) U.S. Cl. ............................................. 713/401
(58) Field of Search ................... 713/400, 401; 711/167

(56) References Cited

U.S. PATENT DOCUMENTS 5,754,833 * 5/1998 Singh et al. .................... 713/400
5,781,765 * 7/1998 Alexander ...................... 713/400
5,802,132   9/1998 Pathikonda et al. .
5,915,107 * 6/1999 Maley et al. ................... 713/400
6,145,100 * 11/2000 Madduri ..................... 713/400 X

FOREIGN PATENT DOCUMENTS

WO 99/15980   4/1999  (WO) .

* cited by examiner

Primary Examiner—Thomas M. Heckler
(74) Attorney, Agent, or Firm—Jeffrey S. Draeger (57) ABSTRACT

A method and apparatus for source synchronous transfers at frequencies including an odd fraction of a core frequency. A disclosed apparatus includes a signal driver circuit and a strobe signal driver circuit. The signal driver circuit is coupled to generate a cycle for a first signal at a first frequency from a core signal from a core operating at a core clock frequency that is an odd fractional multiple of the first frequency. The strobe signal driver circuit is coupled to generate a strobe signal at an intermediate point of the cycle to allow latching of the first signal triggered by the strobe signal.

29 Claims, 6 Drawing Sheets

METHOD AND APPARATUS FOR SOURCE SYNCHRONOUS TRANSFERS AT FREQUENCIES INCLUDING AN ODD FRACTION OF A CORE FREQUENCY

BACKGROUND

1. Field of the Disclosure

The present disclosure pertains to the field of signal transfer between components. More particularly, the present disclosure pertains to source synchronous transmission of signals at various frequency ratios with respect to a core frequency.

2. Description of Related Art

One limitation on throughput of processing in a computer or other processing system is the interconnection between integrated circuits and/or other components in the system. Interconnection circuits also typically consume significant amounts of power and space on the components. Improved interconnect techniques may advantageously allow faster signaling between components thereby increasing system throughput. Improved interconnect techniques may also allow different signaling levels that may either allow faster signaling or may reduce area or power consumption of the signaling circuits.

In some cases, interconnect circuits are unable to transfer data as rapidly as a component produces or requests data. One prior art mechanism for dealing with this problem is to provide a bus interface that operates at a lower frequency than a core portion of the component. For example, a number of Intel Pentium® Processors have a core frequency that operates at either even fractional multiplier (e.g., a 1:2, 1:3, etc., bus to core frequency ratio) or an odd fractional multiplier (e.g., a 2:3, 2:5, etc., bus to core frequency ratio).

These processors, however, generally do not employ a source synchronous scheme to interface with a general system bus. The interface with the system bus is referred to as a front side bus as some processors employ a back side bus to interface with a cache memory. The front side bus typically employs a clocking scheme where signals are latched and captured with reference to a common system clock signal rather than one which is transferred along with the data or command signals being transferred as is done in a typical source synchronous arrangement.

Prior art processors also include back side buses employing source synchronous signaling. In fact such source synchronous signaling has been accomplished using even fractions of the core clock frequency in processors such as the Intel Pentium® II processor. Prior art processors, however, may not have implemented an adequate source synchronous interface for high speed operation at a bus frequency that is an odd fraction of the core clock frequency.

SUMMARY

A method and apparatus for source synchronous transfers at frequencies including an odd fraction of a core frequency is disclosed. A disclosed apparatus includes a signal driver circuit and a strobe signal driver circuit. The signal driver circuit is coupled to generate a cycle for a first signal at a first frequency from a core signal from a core operating at a core clock frequency that is an odd fractional multiple of the first frequency. The strobe signal driver circuit is coupled to generate a strobe signal at an intermediate point of the cycle to allow latching of the first signal triggered by the strobe signal.

BRIEF DESCRIPTION OF THE FIGURES

The present invention is illustrated by way of example and not limitation in the figures of the accompanying drawings.

DETAILED DESCRIPTION

The following description provides a method and apparatus for source synchronous transfers at frequencies including an odd fraction of a core frequency. In the following description, numerous specific details such as signal names, frequency ratios, circuit arrangements, and logic partitioning/integration choices are set forth in order to provide a more thorough understanding of the present invention. It will be appreciated, however, by one skilled in the art that the invention may be practiced without such specific details. In other instances, control structures and gate level circuits have not been shown in detail in order not to obscure the invention. Those of ordinary skill in the art, with the included descriptions, will be able to implement the necessary logic circuits without undue experimentation.

The source synchronous circuitry described herein may allow high speed source synchronous signaling at a frequency that is an odd fraction of a core frequency. This feature may advantageously allow a component such as a processor to operate at a higher frequency or to have a bus interface that operates at a higher frequency than possible using only even multiples or a same-frequency interface. Alternatively, this feature may allow a larger load (e.g., more memory devices) to be placed on a bus without impacting the core operating frequency of a component interfacing with the bus.

Some embodiments of the source synchronous circuitry described herein also implement various features designed for closely matched timings between source synchronous signals and there associated strobe (clock) signals. For example, some embodiments may route clocks to a series of unused but connected latches in order to maintain equal loading on both data and strobe clocks. Some embodiments may employ latch elements with equal gate delays from the clock to the data output regardless of whether the latch triggers off of a rising or a falling edge. This feature may be advantageous where bus frequencies that are odd fractions of the core frequency are used since bus cycles at such frequencies begin and end on opposite edges of the core clock.

Figure 1:
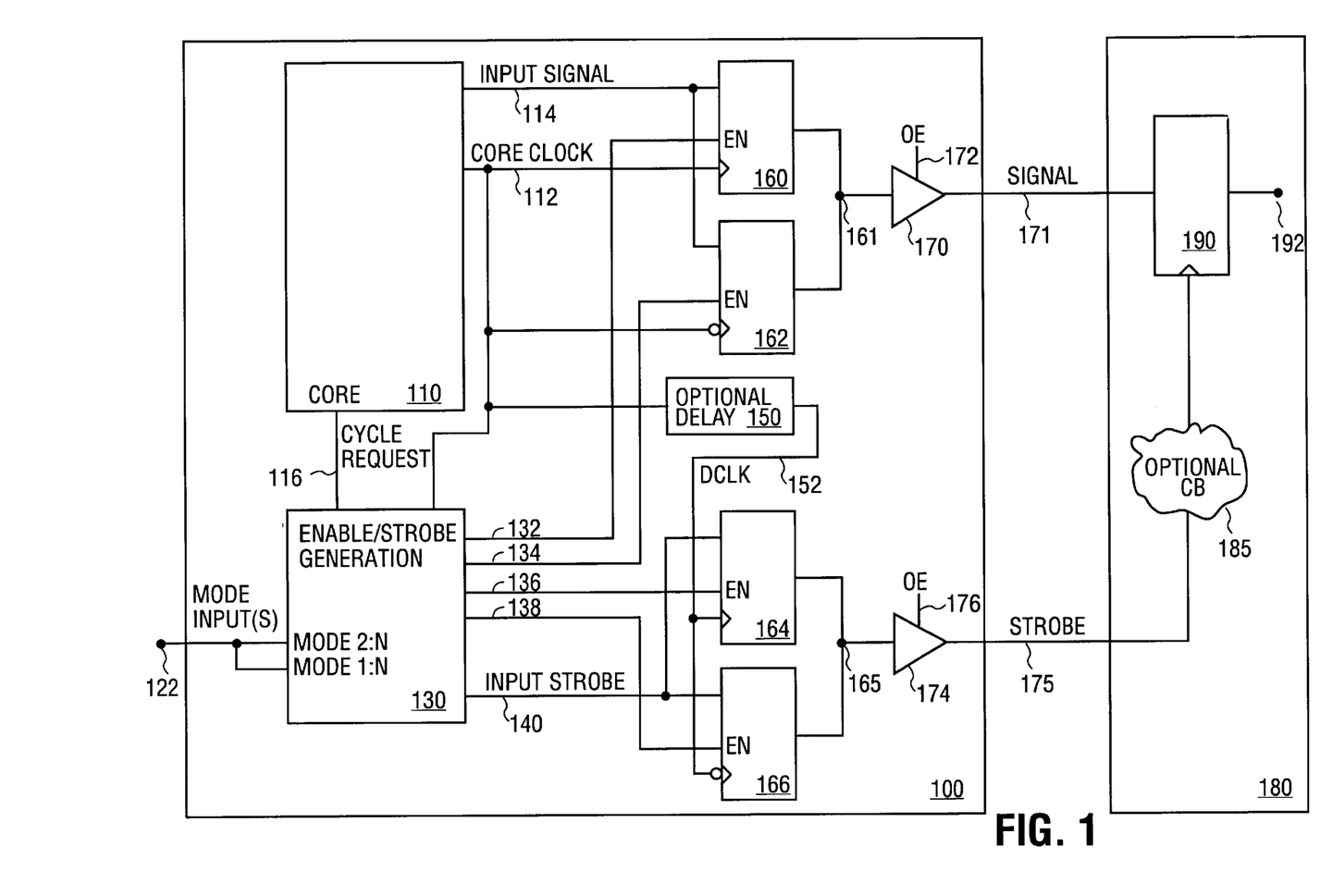
FIG. 1 illustrates one embodiment of a system including a driver and receiver utilizing presently disclosed source synchronous techniques.

FIG. 1 illustrates a generalized embodiment of a source synchronous driver 100 and receiver 180 that are capable of operating in multiple core to bus frequency ratios, including odd fractional ratios. The driver 100 has a core 110 which operates at a core clock frequency. A signal and a strobe are respectively transmitted to the receiver 180 on signal lines 171 and 175 and may transition with the same frequency as the core frequency, at an even fraction of the core frequency (e.g., one-half, one-third, etc.), or at an odd fraction of the core frequency (e.g., two-thirds, two-fifths, etc.). To accommodate the odd fractional interface, the driver 100 may drive the signal and/or the strobe on both rising and falling clock edges of the core clock signal that is provided on a signal line 112.

Cycles originate in the core 110 with a cycle request being made on signal line 116. The core 110 also generates an input signal on a signal line 114 to be driven by an output driver circuit 170 on the signal line 171. An enable and strobe generation circuit 130 receives the cycle request and generates the appropriate signals to latch the input signal and drive it to the bus synchronized with the strobe.

A first signal latch 160 is a rising edge triggered latch coupled to receive the core clock signal. This latch passes the input signal to a predriver node 161 at a rising edge of the core clock signal. A second signal latch 162 is a falling edge triggered latch coupled to receive the core clock signal. This latch passes the input signal to the predriver node 161 on falling edges of the core clock signal.

The enable and strobe generation circuit 130 generates enable signals on enable lines 132 and 134 for the latches 160 and 162 according to signals received at the mode input(s) 122. In an odd fractional mode (e.g., 2:N, N=3, 5, etc.), the enable signals cause the latches to be alternately enabled so that subsequent input signals transitions are driven to the predriver node 161 on rising and falling edges of the core clock. In even modes (e.g., 1:1, 1:2, 1:3), signals may be driven off the same edge of the core clock signal, so one of the two latches may not need to be used.

In a source synchronous arrangement, the strobe or clock signal that is transmitted by the driver to the receiver is typically used by the receiver to latch the transmitted signal. As illustrated, the strobe passes through an optional combinational block (CB) 185 and clocks a latch 190. The strobe is generally located (i.e., it transitions or triggers the latch) at an intermediate point in the cycle in which the signal is transmitted in order to properly latch the received signal. In some embodiments, the strobe is centered or approximately centered at the midpoint of the cycle. The strobe position may vary in different embodiments as long as it is available to latch the signals with which the strobe is transmitted.

In order to center or otherwise adjust the position of the strobe signal, an optional delay circuit 150 may be used. In the illustrated embodiment, the core clock signal is delayed and a delayed clock (DCLK) signal is generated on a signal line 152. The delayed clock signal then is used to trigger a rising edge triggered latch 164 and a falling edge triggered latch 166 in a manner similar to the latches 160 and 162. The delayed clock may be used to place strobe edges in locations where the core clock does not transition. For example, there would not be a transition of the core clock signal (either rising or falling) available to trigger a strobe at the midpoint of a bus cycle when a two-thirds bus to core frequency ratio is used.

Alternatively, the strobe may be generated at another intermediate point in the bus cycle when the core frequency is greater than the bus frequency. For example, an internal core clock transition occurring after the bus cycle begins may be used to generate the strobe. This strobe may not be centered but may still be used to latch the signal, thereby obviating the need for the optional delay circuit 150 in some embodiments. The optional combinational block 185 may be used to ensure that signals captured by non-delayed strobes are properly captured.

The enable and strobe generation circuit 130 generates appropriate enable signals for latches 164 and 166 on signal lines 136 and 138 depending on the mode indicated by mode input(s) 122. Thus, latches 164 and 166 alternate driving a strobe predriver node 165 in odd fractional modes. In even modes the strobe may be driven off one edge of the core clock signal, so only one of the two latches may need to be used. The enable and strobe generation circuit 130 also generates an input strobe signal on a signal line 140 that is fed into both latches.

When data is to be driven from the driver 100 to the receiver 180, output enable (OE) signals are asserted or remain asserted on signal lines 172 and 176 respectively enabling the signal and strobe output driver circuits 170 and 174. The signal and strobe may be synchronized so that they are driven to the receiver with a controlled relationship based on the core clock signal. The latch 190 in the receiver 180 latches the signal based on the strobe input and provides the signal at a node 192 for use within the receiver. Thus, the embodiment of FIG. 1 provides for source synchronous transmission of signals between a driver 100 and a receiver 180 with a strobe being provided at an intermediate point in a bus cycle even if bus cycles operate at a frequency that is an odd fraction of the core frequency of the driver 100.

Figure 2:
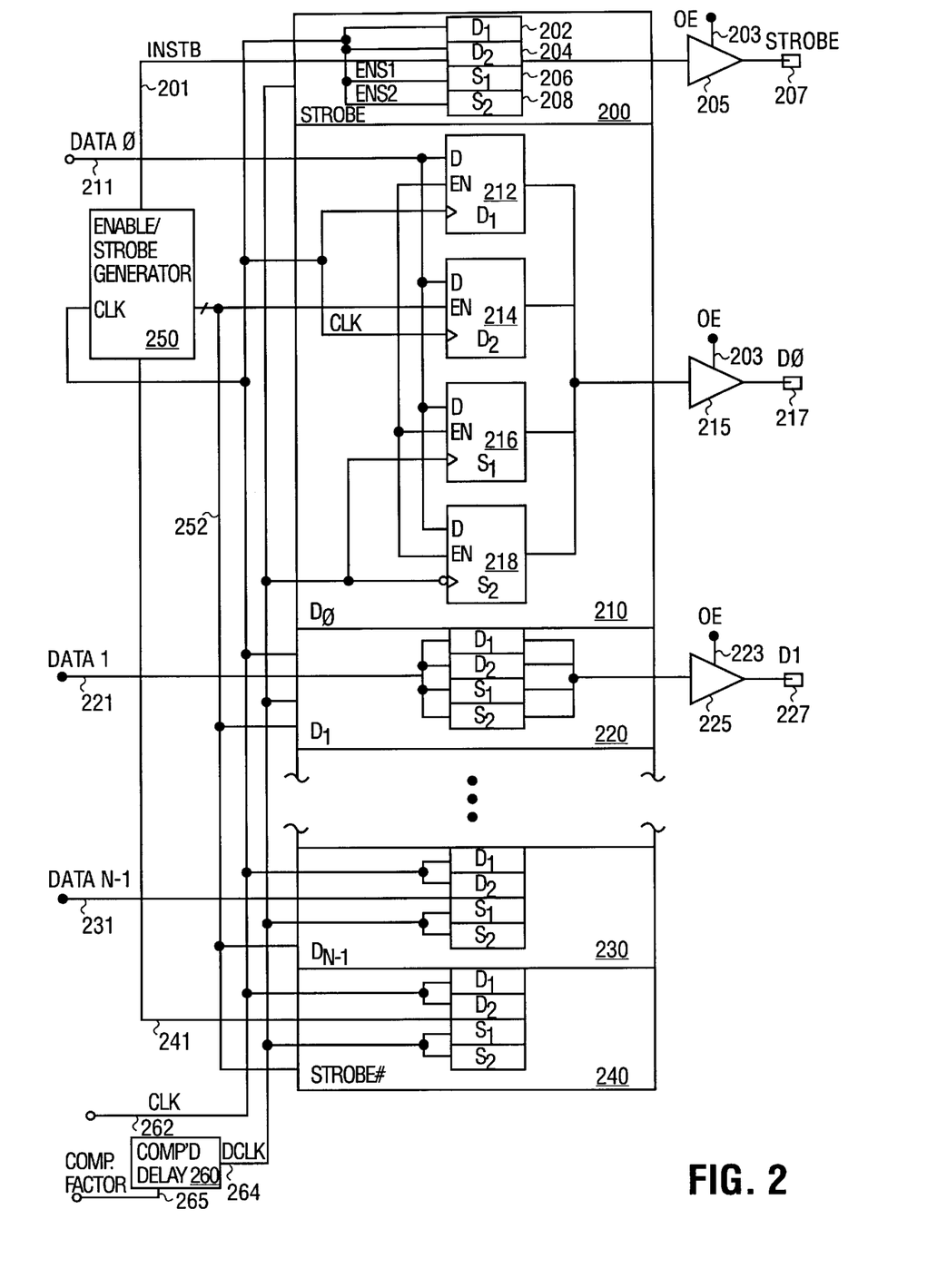
FIG. 2 illustrates one embodiment of a balanced source synchronous driver for a data bus.

FIG. 2 illustrates another embodiment of a source synchronous driver. In the embodiment of FIG. 2, a core clock signal (CLK) and a delayed clock signal (DCLK) are routed to a set of data and strobe latch elements. Although both clock signals are not used in all of the latch elements, the uniform routing and loading balances the loads on these clocks and limits skew between the data signals and the associated strobes.

In the embodiment of FIG. 2, two strobe signals are driven with a set of N data bits (D0–DN-1). Each signal driven has a latch element that includes four latches. A latch element 200 receives an internal strobe signal (INSTB) generated by an enable and strobe generator circuit 250 that is clocked by the core clock signal. This latch element 200 includes four latches, latch D1 202, latch D2 204, latch S1 206, and latch S2 208. Latches D1 and D2 are triggered by the core clock signal and latches S1 and S2 are triggered by the delayed core clock signal. The output of the latch element 200 is driven by an output driver 205 to a strobe output 207 when an output enable signal (OE) is asserted on a signal line 203. Enable signals from the enable and strobe generator circuit 250 are also provided to the latch element 200 on an enable signal bus 252. For example, enable strobe 1 (ENS1) and enable strobe 2 (ENS2) signals are provided to latches S1 206 and S2 208.

One embodiment of the latch element 210 for data bit zero (DATA 0) is shown in greater detail in FIG. 2. Data bit zero, provided on a signal line 211, is coupled to the data inputs of internal latches 212, 214, 216, and 218. Appropriate enable signals (depending on the mode of operation) are coupled to these four latches as well. Latches D1 212 and D2 214 are coupled to receive the core clock signal and latches S1 216 and S2 218 are coupled to receive the delayed clock signal. The output of the four latches within latch element 210 is driven by an output driver 215 to a D0 output 217 when an output enable signal is asserted on a signal line 203. The enables are generated to ensure that only one latch is enabled to drive the shared output node at a time.

Similarly, a latch element 220 for data bit one (DATA 1) is coupled to receive both the core clock signal (latches D1 and D2) and the delayed clock signal (latches S1 and S2). Appropriate enable signals are provided by the enable and strobe generator circuit 250. The first data bit is provided on a signal line 221 to all four latches in the latch element 220, and an output driver 225 drives the output of the four latches to a D1 output 227 when an output enable signal is asserted on a signal line 223.

A latch element 230 for the Nth data bit (DATA N-1) is coupled to receive both the core clock signal (latches D1 and D2) and the delayed clock signal (latches S1 and S2). Appropriate enable signals are provided by the enable and strobe generator circuit 250. The Nth data bit is provided on a signal line 231 to all four latches in the latch element 230, and an output driver (not shown) drives the output of the four latches to an output node as discussed with respect to the other signals.

A latch element 240 for the complementary strobe signal (STROBE#) is coupled to receive both the core clock signal (latches D1 and D2) and the delayed clock signal (latches S1 and S2). Again, appropriate enable signals are provided by the enable and strobe generator circuit 250 as is an input strobe# signal on a signal line 241. The input strobe# signal is provided on a signal line 241 to all four latches in the latch element 240, and an output driver (not shown) drives the output of the four latches to an output node as discussed with respect to the other signals.

A compensated delay circuit 260 may be employed to generate the delayed clock signal from the core clock signal on signal line 262. The delay circuit 260 receives a compensation factor on a signal line 265 in this embodiment. The delay circuit 260 adjusts according to the compensation factor to maintain a relatively stable timing relationship between CLK and DCLK despite varying device performance. The compensation factor may be generated by a circuit that is capable of detecting process, temperature, and/or voltage conditions that generally alter performance characteristics of devices. Such compensation and delay circuits are known in the art and any appropriate known or otherwise available circuits may be used. Since a delay circuit is used, a phase locked loop or other large clock generator circuit may not be needed to generate a special clock for the source synchronous interface in some embodiments.

Figure 3:
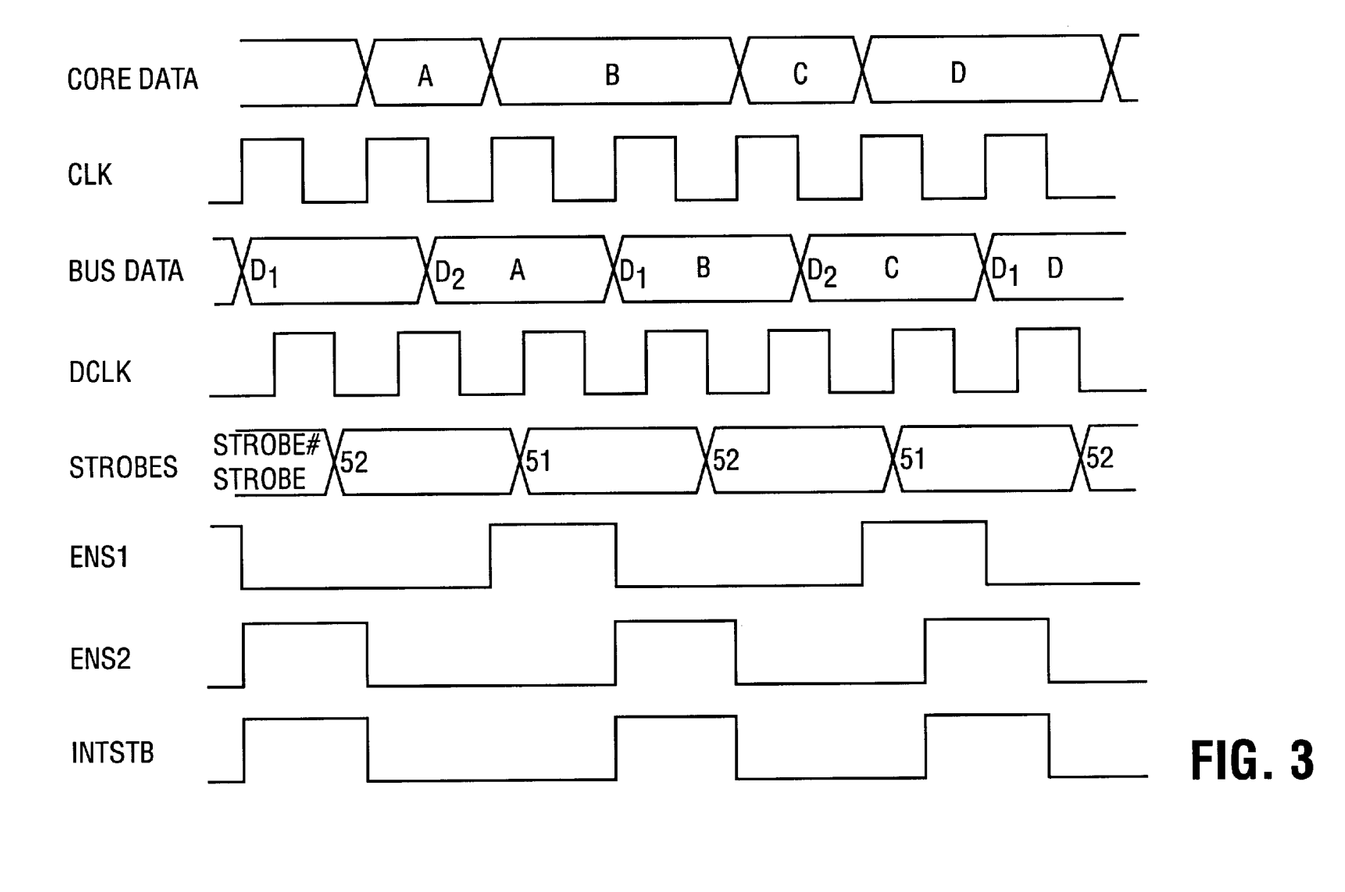
FIG. 3 illustrates waveforms generated by one embodiment of the source synchronous driver of FIG. 2.

FIG. 3 illustrates operational waveforms for one embodiment of the driver of FIG. 2 in a two-thirds core to bus frequency ratio. Therefore, in this embodiment, the delay circuit 260 delays the core clock signal one-quarter cycle to produce the delayed clock signal (DCLK) on signal line 264. Core data is provided by the core at rising edges of the core clock signal (CLK). A handshaking mechanism may be used to prevent data from the core overwriting previously dispatched data until the data is successfully transmitted at the lower bus frequency. Thus, core data (A, B, C, D) is alternately held at the latch inputs for one or two core clock cycles.

Core data A is driven by the core at the rising edge of the core clock signal. For this example, only the latch element 210 is discussed; however, it is to be understood that other latch elements for data signals operate similarly in this embodiment. Latch D2 214 is enabled by the enable and strobe generator circuit 250 at the next falling edge of the core clock signal to drive data A to the bus at the start of the next bus cycle. Data B is then provided to the latch element 210 by the core. At the second subsequent rising edge, latch D1 is enabled by the enable and strobe generator 250 to drive data B to the bus at the start of the next bus cycle.

Similarly, data C is driven out through latch D2 at the start of the next bus cycle, and data D is driven out through latch D1 at the start of the bus cycle after data C is driven. Thus, the enable signals and the rising and falling edge triggered latches allow data to be driven to the bus as a "mixed color" signal, a signal triggered off rising and falling edges of the same clock.

The strobe signals (STROBE and STROBE#) are similarly generated. FIG. 3 also illustrates exemplary versions of strobe enable signals (ENS1 and ENS2) that may be used in conjunction with the latch element 200 of FIG. 2 to create the STROBE signal shown in FIG. 3. As can be seen from FIG. 3, both the input strobe and the enable signals for both data and strobes may advantageously be generated by standard combinational logic triggered off the core clock signal as these signals may transition only at edges of the core clock signal in some embodiments.

The ENS1 signal may be applied to the latch S1 206 and the ENS2 signal may be applied to the latch S2 208 in latch element 200. The INSTB signal on signal line 201 may be applied to all four latches of the latch element 200. As a result, latches S1 and S2 will alternate driving the output of the latch element 200, producing the mixed-color strobe signal shown in FIG. 3.

Figure 4:
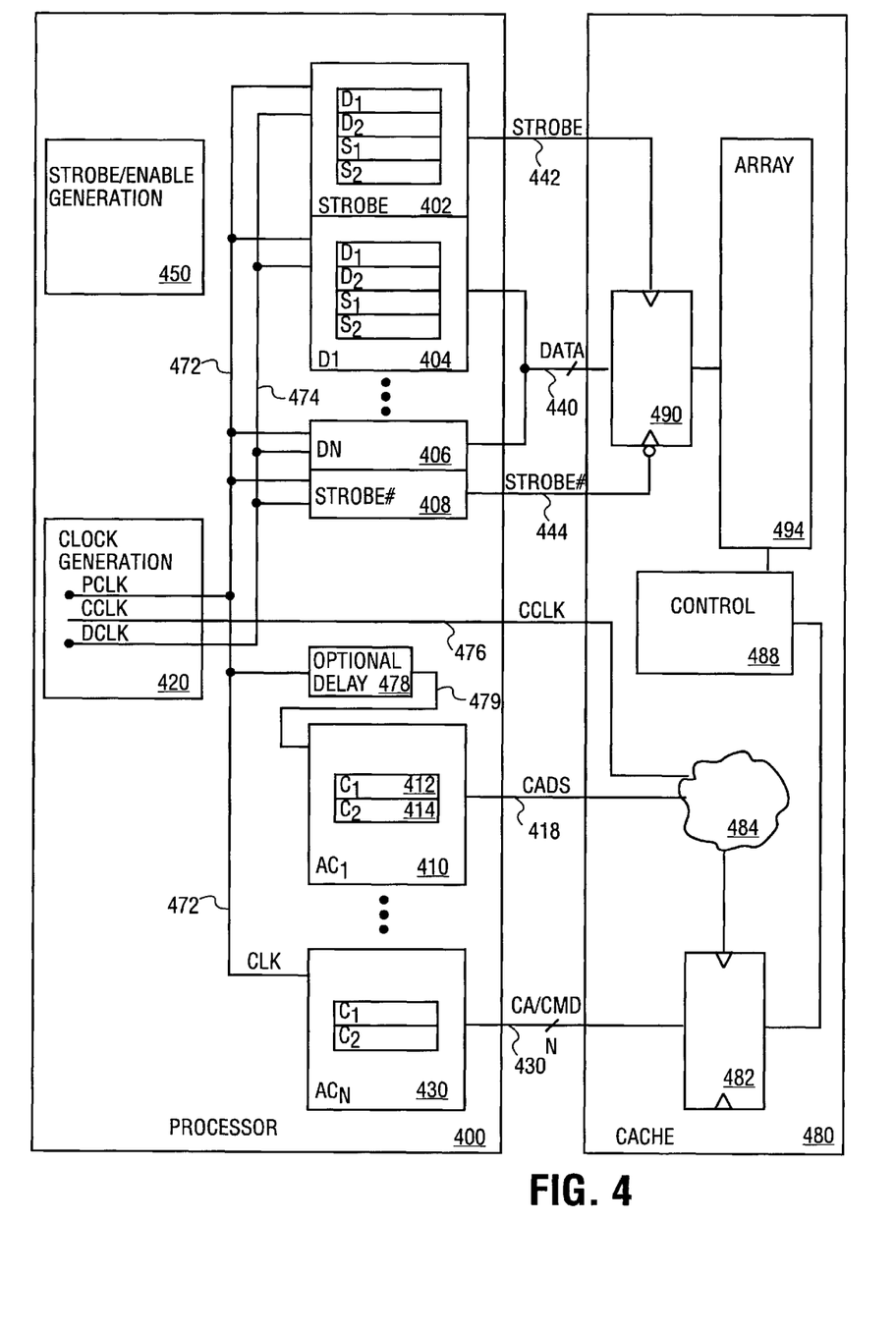
FIG. 4 illustrates a source synchronous interface including data, address, and command signals.

FIG. 4 illustrates an embodiment capable of transmitting data, address, and command signals in a source synchronous manner at frequencies including odd fractional bus to core ratios. In this embodiment, a processor 400 is coupled to communicate strobe signals, data signals, a cache clock signal, an address strobe signal, and address and command signals to a cache 480 in a source synchronous manner. This arrangement allows a full source synchronous interface from the processor 400 to the cache 480.

The processor 400 includes a strobe latch element 402 and data latch elements 404 and 406. A complementary strobe latch element 408 is also included. Similarly to the embodiment of FIG. 3, these latch elements may all be coupled to receive both a processor clock signal (PCLK) on a signal line 472 and a delayed clock signal (DCLK) on a signal line 474 to provide balanced loading on these clock signals, thereby preserving the timing relationship between the data and strobe signals.

The processor 400 includes a strobe and enable generation circuit 450 to provide proper strobe signals and proper timing to enable individual latches (e.g., D1, D2, S1, S2) within the latch elements. The processor 400 drives a strobe signal over the signal line 442 and a complementary strobe signal line over the signal line 444 in conjunction with data being driven over a data bus 440. A latch 490 in the cache 480 is coupled to latch data from the data bus 440 using one or both of the strobe signals. This data may then be stored in a cache array 494 by a control circuit 488. Notably, a return path is typically provided so that the cache 480 can provide access to data within the array 494 to the processor 400.

The processor 400 also generates a variety of address and command signals for the cache 480. A first latch element 410 provides an address strobe (CADS) to the cache 480 on a signal line 418. The latch element 410 includes two individual latches, latch C1 412 and latch C2 414. In this embodiment, the command and address signals are not driven off a delayed clock such as DCLK, but rather are all driven off of the core processor clock, PCLK. A clock generation circuit 470 on the processor also provides a bus frequency clock, CCLK, to the cache 480 on a signal line 476.

Other address and command signals may be transferred to the cache 480 using latch elements such as latch element 420, which also has two internal individual latches. As illustrated, N address and/or command signals may be transferred via a bus 430 in this manner. The cache 480 may use a combinational block 484 to combine the address strobe signal CADS and the bus frequency clock CCLK to generate a clock for a latch 482 that latches address and command signals.

In one embodiment where a core to bus frequency ratio of two-thirds is used, there may be two selectable performance levels. Factors such as loading due to the size of the cache 480 may influence which performance level is selected. In one mode, the address strobe may be generated as four PCLK phases in duration. In a higher performance mode, the address strobe may be offset from the PCLK edges by employing an optional delay 478 that generates a delayed PCLK signal on a signal line 479, allowing the address strobe to be a three PCLK phase signal. In this case, less setup and hold time may be available.

When a one-to-one core to bus frequency ratio is used, two performance options may also be available. First, one core clock cycle may be allowed for address bus setup time. This may be a highest performance option for use with a small number of agents (e.g., cache memory chips) loading the bus. A second option is to allow two core clock periods for address bus set-up time. This second option may be advantageous in embodiments where the bus is more heavily loaded.

The control circuit 488 in the cache 480 receives command and address signals from the processor 400. The control circuit 488 performs the requested operations on the array 494, either returning, storing, or invalidating data, or otherwise changing bits in the array 494. Thus, the embodiment of FIG. 4 allows a fully functional source synchronous interface between a cache and a processor which may be used in other components or other environments.

Figure 5:
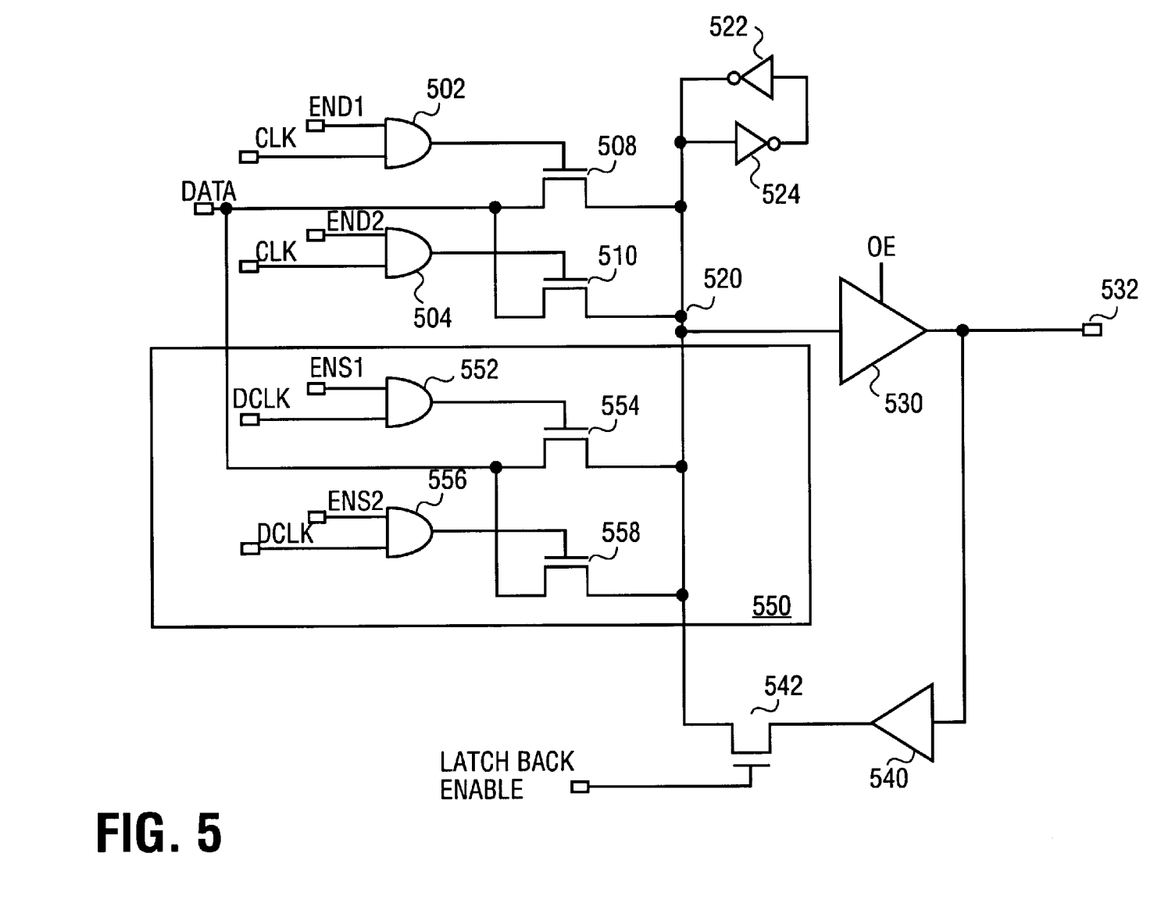
FIG. 5 illustrates one embodiment of a latch element that can provide an output signal on both rising and falling edges of a clock signal.

FIG. 5 illustrates one embodiment of a latching element that may be used, for example, as a latching element for a data bit or a strobe signal in embodiments such as those of FIGS. 2 or 4. In addition, the latching element of FIG. 5 includes a latchback feature to allow a bus signal line 532 to be continuously driven. This may be advantageous, for example, in a bus architecture that utilizes a termination or driving technique that assumes continuous driving of the bus to maintain proper signal levels.

A data signal is provided to a first pass element 508 and a second pass element 510. The pass element 508 is enabled due to an AND gate 502 asserting its output when an enable data latch 1 (END1) signal is asserted and the clock signal (CLK) is at a logical one level. Similarly, the second pass element 510 is enabled due to an AND gate 504 asserting its output when an inverse clock signal (CLK#) is at a logical one level and an enable data latch 2 (END2) signal is asserted. Thus, a predriver node 520 may be driven through the first pass element 508 on rising edges of CLK and through the second pass element 510 on falling edges of CLK (i.e., rising edges of CLK#).

An output driver 530 drives the signal at the predriver node 520 when an output enable (OE) signal is asserted. A latchback enable signal may be asserted to sustain a value from the bus signal line 532 that is read in through an input circuit 540 and passed through a pass element 542.

An optional second portion of the latch element shown in FIG. 5 is the circuit 550 which is clocked by a delayed clock (DCLK). The circuit 550 may be employed in some embodiments for data and strobe circuits, but may not be needed in some embodiments for address and command signals. In some embodiments, the circuit 550 may be identical to the other two individual latch elements above to help ensure that timings between strobe and data signals are closely matched.

With respect to the circuit 550, the data signal is provided to a first pass element 554 and a second pass element 558. The pass element 554 is enabled due to an AND gate 552 asserting its output when an enable strobe latch 1 (ENS1) signal is asserted and the delayed clock signal (DCLK) is at a logical one level. Similarly, the second pass element 558 is enabled due to an AND gate 556 asserting its output when an inverse delayed clock signal (DCLK#) is at a logical one level and an enable strobe latch 2 (ENS2) signal is asserted. Thus, the predriver node 520 may be driven through the first pass element 554 on rising edges of DCLK and through the second pass element 558 on falling edges of DCLK (i.e., rising edges of DCLK#).

Figure 6:
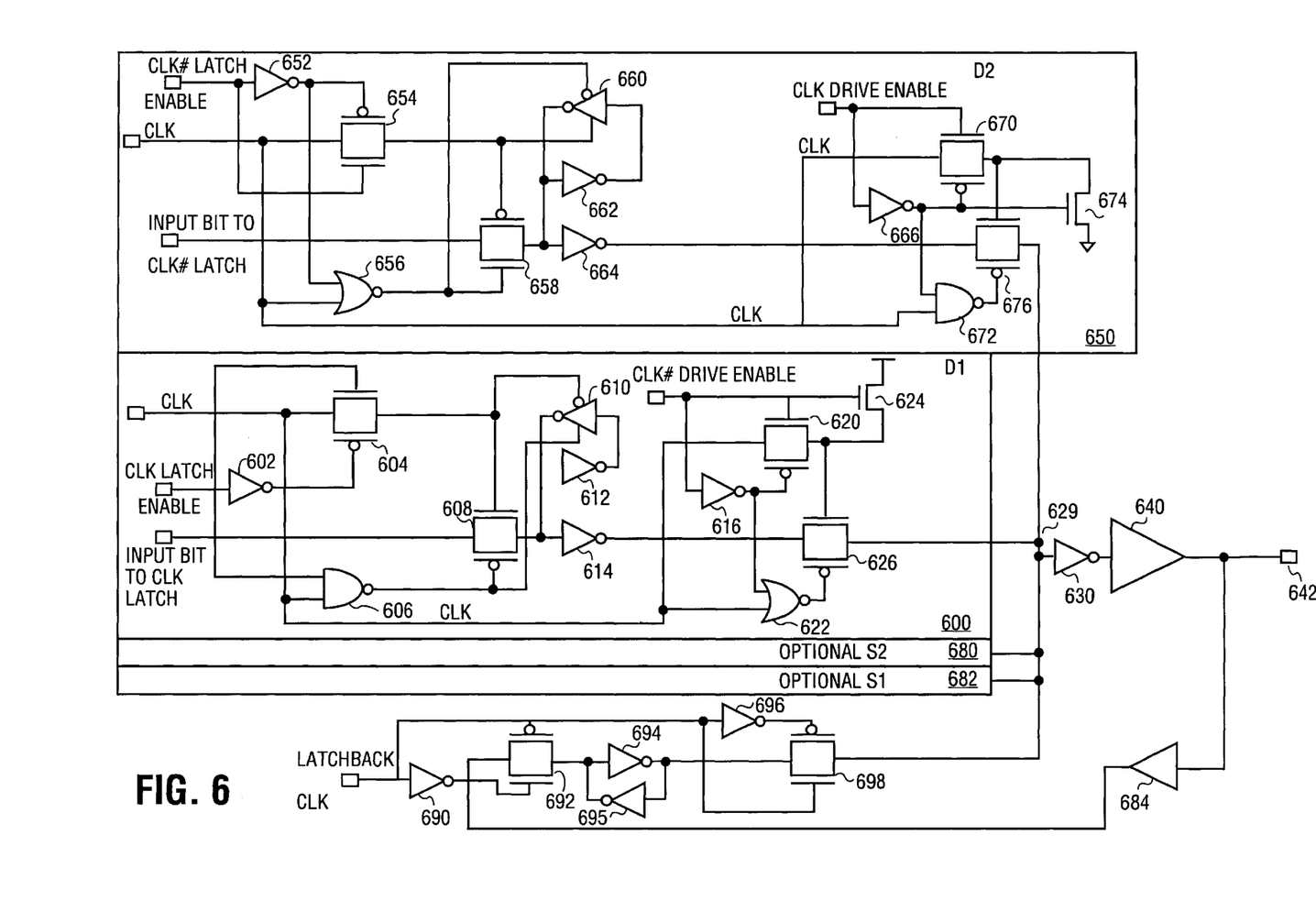
FIG. 6 illustrates another embodiment of a latch element that can provide an output sign on both rising and falling edges of a clock signal and has equivalent gate delays from the clock signal to the predriver node.

FIG. 6 illustrates another embodiment of a latch element for use with the source synchronous techniques of the present disclosure. This embodiment may include unused latches to allow clock signal balancing and may include carefully matched clock-to-output paths so that equal numbers of gate delays may occur from clock signals to outputs regardless of which clock edge causes an output signal transition. Such precise control may be highly advantageous in high speed source synchronous interfaces because positioning of the strobe with respect to data (or commands or address signals) may be closely controlled. Such closely controlled timings may allow higher speed operation.

In the embodiment of FIG. 6, an individual D1 latch 600 and its complementary D2 latch 650 are provided. In some embodiments, optional S1 latch 680 and S2 latch 682, which may be identical to latches 600 and 650, are provided to balance clock loading.

The latch 650 includes an inverter 652 coupled to receive a CLK# latch enable signal. The CLK# latch enable signal is coupled to a first (active high) enable input of a pass gate 654. An inverted CLK# latch enable signal from the inverter 652 is coupled to the second (active low) enable input of the pass gate 654. The pass gate 654 passes the CLK signal when enabled. The output of the pass gate 654 is coupled to an active low enable input of a pass gate 658 and to an active high enable of a tri-state inverter 660 which is connected in a cross-coupled inverter pair arrangement with an inverter 662. The input of the inverter 662 and the output of the tri-state inverter 660 are coupled to the output of the pass gate 658.

The input of the pass gate 658 is coupled to receive the input bit (e.g., a data bit) to the CLK# latch. An inverter 664 inverts the output of the pass gate 658. The active high enable input of the pass gate 658 is coupled to receive a signal generated by a NOR gate 656. The output of the NOR gate 656 also is coupled to an active low enable input of the tri-state inverter 660. Thus, the tri-state inverter is only enabled when the pass gate 658 is closed.

The NOR gate 656 has a first input coupled to receive the output of the inverter 652 and a second input coupled to receive the CLK signal. The NOR gate 656 may be designed as a traditional NOR gate with two series P channel transistors coupled between the supply voltage and the output node and two parallel N channel transistors driving an output node. To equalize delays from the NOR gate 656, the CLK signal may be coupled to either N channel transistor and the P channel transistor that is directly attached to the NOR gate output so that there is one gate delay from the CLK signal to the NOR gate output. This one gate (transistor) delay matches the one transistor delay produced when the CLK signal passes through the pass gate 604.

A pass gate 670 has an active high input coupled to receive a CLK drive enable signal. An active low input of the pass gate 670 is coupled to receive an inverted version of the CLK drive enable signal generated by an inverter 666. The pass gate 670 passes the CLK signal when enabled. When the pass gate 670 is disabled, a N channel transistor 674 drives the output of the pass gate 670 to ground due to its gate being connected to the output of the inverter 666.

The output of the pass gate 670 is provided at an active high enable input of a pass gate 676 that receives the input signal once it passes through the pass gate 658 and the inverter 664. An active low enable input of the pass gate 676 is generated by a NAND gate 672 having a first input coupled to receive the output of the inverter 666 and a second input coupled to receive the CLK signal. The output of the pass gate 676 is coupled to a predriver node 629.

The NAND gate 672 may also be a traditionally designed NAND gate (two parallel P channel transistors coupled between a supply voltage and the output node and two series N channel transistors coupled between a ground supply voltage and the output node); however, the NAND gate 672 may be connected to assure that equal clock-to-output delays occur. Thus, the CLK signal may be coupled to either P channel transistor and to the N channel transistor that is directly coupled to the NAND gate output. Accordingly, both active low and active high enable inputs of the pass gate 676 receive enable signals through the same number of gate (transistor) delays from the CLK signal.

The latch 600 includes an inverter 602 coupled to receive a CLK latch enable signal. The CLK latch enable signal is coupled to a first (active high) enable input of a pass gate 604. An inverted CLK latch enable signal from the inverter 602 is coupled to the second (active low) enable input of the pass gate 604. The pass gate passes the CLK signal when enabled. The output of the pass gate 604 is coupled to an active high enable input of a pass gate 608 and to an active low enable of a tri-state inverter 610 which is connected in a cross-coupled inverter pair arrangement with an inverter 612. The input of the inverter 612 and the output of the tri-state inverter 610 are coupled to the output of the pass gate 608. As discussed above with respect to NAND gate 672, the CLK signal may be coupled to a selected one of the two inputs such that the clock-to-output delay is one transistor.

The input of the pass gate 608 is coupled to receive the input bit (e.g., a data bit) to the CLK latch. In the illustrated embodiment, the same data bit is input to latches D2 650 and D1 600. The active high enable input of the pass gate 608 is coupled to receive a signal generated by a NAND gate 606. The NAND gate 606 has a first input coupled to receive the CLK latch enable signal and a second input coupled to receive the CLK signal. As discussed above with respect to the NOR gate 656, the CLK signal may be coupled to a selected one of the two inputs such that the clock-to-output delay is one transistor, matching the delay of a pass gate 620. The output of the NAND gate 606 also is coupled to an active high enable input of the tri-state inverter 610. Thus, the tri-state inverter 610 is only enabled when the pass gate 608 is closed. An inverter 614 inverts the output of the pass gate 608.

The pass gate 620 has an active high input coupled to receive a CLK# drive enable signal. An active low input of the pass gate 620 is coupled to receive an inverted version of the CLK# drive enable signal generated by an inverter 616. The pass gate 670 passes the CLK signal when enabled. When the pass gate 620 is disabled, a P channel transistor 624 drives the output of the pass gate 670 to a logical one (high) level due to its gate being connected to the CLK# drive enable signal.

The output of the pass gate 620 is provided at an active high enable input of a pass gate 626 that receives the input signal once it passes through the pass gate 608 and the inverter 614. An active low enable input of the pass gate 626 is generated by a NOR gate 622 having a first input coupled to receive the output of the inverter 616 and a second input coupled to receive the CLK signal. The output of the pass gate 626 is coupled to the predriver node 629. An output driver 640 drives a signal line 642 with the value from the predriver node 629 after it is inverted by an inverter 630.

Latchback circuitry in this embodiment includes an input circuit 684 coupled to receive a value from the signal line 642 and to drive the value to a data input of a pass gate 692. A latchback clock is inverted by an inverter 690 and provided to the active high input of the pass gate 692, the latchback clock itself being supplied to the active low input of the pass gate 692. The output of the pass gate 692 is inverted by an inverter 694, sustained by a sustaining inverter 695, and driven to an input terminal of a pass gate 698. The pass gate 698 has an active high enable input coupled to receive the latchback clock and an active low enable input coupled to receive an inverted version of the latchback clock inverted by an inverter 696. Accordingly, the latchback circuitry provides a value at the predriver node 629 which allows the output driver 640 to sustain a last value driven on the bus. Since node 629 is driven by multiple drivers, it may be advantageous to ensure that the CLK drive enable, the CLK# drive enable, and the latchback clock signals do not overlap such that contention is caused.

Thus, a method and apparatus for source synchronous transfers at frequencies including an odd fraction of a core frequency is disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. An apparatus comprising:
   a first signal driver circuit coupled to generate a cycle for a first signal at a first frequency from a core signal from a core operating at a core clock frequency that is an odd fractional multiple of the first frequency; and
   a strobe signal driver circuit coupled to generate a strobe signal at an intermediate point of the cycle to allow latching of the first signal triggered by the strobe signal.

2. The apparatus of claim 1 wherein the core clock frequency is the odd fractional multiple of the first frequency in a first mode and wherein the core clock frequency is the same as the first frequency in a second mode.

3. The apparatus of claim 2 wherein the core clock frequency is twice the first frequency in a third mode.

4. The apparatus of claim 1 wherein the odd fractional multiple is three-halves.

5. The apparatus of claim 4 wherein the first signal is a data signal and wherein the intermediate point is approximately a midpoint of the cycle.

6. The apparatus of claim 5 wherein the first signal driver circuit comprises:
   a rising edge triggered latch coupled to receive an input data signal and a core clock signal operating at the core clock frequency and to provide said input data signal at a rising edge triggered latch output after a rising edge of the core clock signal;

a falling edge triggered latch coupled to receive said input data signal and to provide said input data signal at a falling edge triggered latch output after a falling edge of the core clock signal;

an enable generation circuit coupled to provide enable signals to alternately enable the rising edge triggered latch and the falling edge triggered latch to drive a predriver node; and a data signal output driver having a data signal output driver input coupled to the predriver node and a data signal output driver output at which the data signal for the data cycle is generated.

7. The apparatus of claim 6 wherein the strobe signal driver circuit comprises:

a second rising edge triggered latch coupled to receive an input strobe signal and a delayed core clock signal operating at the core clock frequency and to provide said input strobe signal at a second rising edge triggered latch output after the rising edge of the delayed core clock signal;

a second falling edge triggered latch coupled to receive said input strobe signal and to provide said input strobe signal at a second falling edge triggered latch output after the falling edge of the delayed core clock signal;

a second enable generation circuit coupled to provide enable signals to alternately enable the second rising edge triggered latch and the second falling edge triggered latch to drive a strobe predriver node; and a strobe signal output driver coupled to drive a strobe input value at the strobe predriver node to generate the strobe signal.

8. The apparatus of claim 7 wherein the odd fractional multiple is two-thirds and further comprising a compensated delay chain to delay the core clock signal one quarter cycle to generate the delayed core clock signal.

9. The apparatus of claim 1 further comprising:

a latchback device selectably enabled to drive values from a signal line back out on to the signal line using at least an output stage of the first signal driver circuit.

10. The apparatus of claim 1 further comprising:

a delay circuit coupled to delay a first clock signal to generate a delayed first clock signal, the first signal driver circuit being triggered to drive the first signal by an edge of the first clock signal and the strobe signal driver circuit being triggered to drive the strobe signal by an edge of the delayed first clock signal, the first clock signal and the delayed first clock signal operating at the core clock frequency.

11. The apparatus of claim 10 wherein the delay circuit is a compensated delay circuit that is adjustable based on a received process, voltage, and temperature compensation factor signal.

12. The apparatus of claim 1 wherein each of the first signal driver circuit and the strobe signal driver circuit comprises:

a first latch triggered off a first edge of a first clock operating at said core clock frequency;

a second latch triggered off a second edge of the first clock;

a third latch triggered off a first edge of a second clock, the second clock operating at the core clock frequency and being delayed one-quarter cycle from the first clock; and a fourth latch triggered off a second edge of the second clock.

13. The apparatus of claim 12 wherein the first latch, the second latch, the third latch, and the fourth latch have matched clock-to-output delays.

14. The apparatus of claim 12 further comprising:

a plurality of data signal driver circuits each having four latches and each being coupled to receive the first clock and the second clock; and a second strobe signal driver circuit having four latches and being coupled to receive the first clock and the second clock.

15. The apparatus of claim 14 wherein all data signal driver circuits trigger off the first clock and have two unused but connected latches and wherein both strobe signal driver circuits trigger off the second clock and have two unused but connected latches.

16. An apparatus comprising:

a processor having a first portion operating at a first frequency and having a source synchronous interface, the source synchronous interface generating a plurality of signals and a clock, the clock transitioning at an intermediate point of a cycle of said plurality of signals, said clock and said plurality of signals transitioning at a second frequency that is an odd fraction of said first frequency; and a memory circuit coupled to said processor, the memory circuit having a memory interface circuit operating at said second frequency and that latches said plurality of signals using said clock that is generated by said processor.

17. The apparatus of claim 16 wherein said source synchronous interface comprises:

a plurality of signal driver circuits, each signal driver circuit being triggered by a first internal clock and also being coupled to receive a second internal clock, providing balanced loading on the first internal clock and the second internal clock;

at least one clock driver circuit that is triggered by the second internal clock and also coupled to receive the first internal clock, providing balanced loading on the first internal clock and the second internal clock.

18. The apparatus of claim 17 wherein said intermediate point is approximately a midpoint of the cycle.

19. The apparatus of claim 18 wherein said processor further comprises a compensated delay chain having an input coupled to receive the first internal clock and having a delay chain output at which is generated the second internal clock.

20. The apparatus of claim 17 wherein each of said plurality of signal driver circuits and said at least one clock driver circuits comprise:

a first latch triggered off a first edge of the first internal clock;

a second latch triggered off a second edge of the first internal clock;

a third latch triggered off a first edge of the second internal clock; and a fourth clock triggered off a second edge of the second internal clock.

21. A method comprising:

transmitting a data cycle for a data signal at a first frequency, the first frequency being an odd fraction of a core frequency of a core from which the data signal originates; and transmitting a strobe signal synchronized to transition at an intermediate point of the data cycle.

22. The method of claim 21 wherein the odd fraction is two-thirds and wherein transmitting the strobe signal comprises transmitting a strobe signal that transitions at approximately a midpoint of the data cycle.

23. The method of claim 21 wherein transmitting the data cycle comprises generating a pair of enable signals at the core frequency to alternately enable a pair of latches clocked by a first core frequency clock that both drive a data signal predriver node.

24. The method of claim 23 wherein transmitting the strobe signal comprises:

generating a strobe enable signal at the core frequency to alternately enable a second pair of latches clocked by a second core frequency clock that both drive a strobe predriver node.

25. The method of claim 24 wherein the odd fraction is two-thirds and wherein the method further comprises delaying the first core frequency clock by one-quarter cycle to generate the second core frequency clock.

26. The method of claim 24 further comprising applying the first core frequency clock and the second core frequency clock to an equal number of loads.

27. The method of claim 26 wherein identical latches are used to generate strobe and data signals to provide a matched delay.

28. An apparatus comprising:

means for providing a first interface signal on a first signal line from a first core signal, the first interface signal transitioning on both rising and falling edges of a core clock signal;

means for providing a strobe signal that transitions at intermediate points between rising and falling edges of the core clock signal to allow latching of the first interface signal using the strobe signal.

29. The apparatus of claim 28 further comprising:

means for latching a value from the first signal line and driving said value back to the signal line.

* * * * *

UNITED STATES PATENT AND TRADEMARK OFFICE
CERTIFICATE OF CORRECTION

PATENT NO. : 6,311,285 B1  
DATED : October 30, 2001  
INVENTOR(S) : Rodriguez et al.

Page 1 of 1

It is certified that error appears in the above-identified patent and that said Letters Patent is hereby corrected as shown below:

<u>Title page,</u>
Item [75], delete "Alper Ilkbahar" and replace with -- Alper Llkbahar --.

<u>Column 2,</u>
Line 15, delete "sign" and replace with -- signal --.

Signed and Sealed this

Nineteenth Day of March, 2002

Attest:

JAMES E. ROGAN
*Director of the United States Patent and Trademark Office*

*Attesting Officer*